Nov. 15, 1960   S. C. SHAPPELL   2,960,596
WELDING CIRCUIT
Filed Nov. 3, 1958
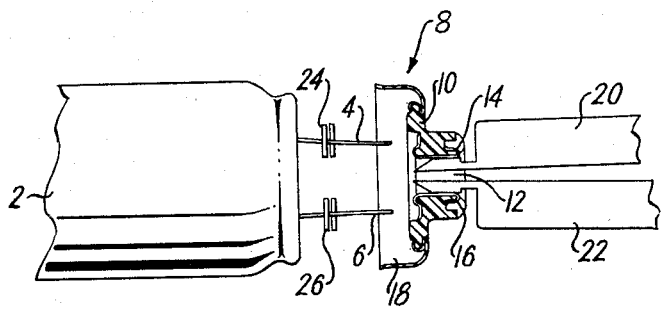
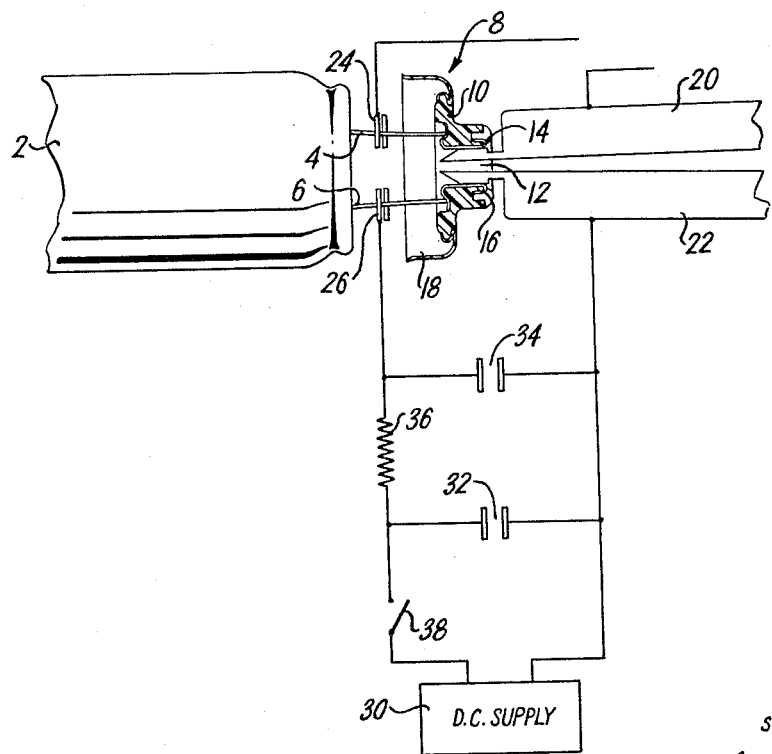
INVENTOR
STANLEY C. SHAPPELL
BY
ATTORNEY ns patent Office 2,960,596
Patented Nov. 15, 1960

2,960,596

WELDING CIRCUIT

Stanley C. Shappell, West Boxford, Mass., assignor, by mesne assignments, to Sylvania Electric Products Inc., Wilmington, Del., a corporation of Delaware Filed Nov. 3, 1958, Ser. No. 771,628

3 Claims. (Cl. 219—113)

This invention relates to the manufacture of electrical devices, and more particularly to the manufacture of electrical devices having lead-in extending therefrom and connected to electrical contact members in bases or caps with which the electrical devices are provided.

In the manufacture of electric lamps, electronic tubes and the like, lead-in wires extending from the lamp or tube envelope are electrically connected to suitable contact members disposed in a base or cap with which the envelope is provided, thereby providing means through which electrical energy may be transmitted to filaments, electrodes and the like within the envelope. Considerable effort has been exerted over the years, in the manufacture of electric lamps and electronic tubes, to insure the attainment of a good electrical connection initially and the maintenance thereof during the life of the article.

Generally speaking, three different means have been employed, in various applications, to establish this electrical connection. They are crimping, soldering and welding. Crimping is usually effected by pinching a base pin through which a lead-in wire extends to obtain a mechanical joining of the lead-in wire to the pin. Soldering is usually effected by the application of a quantity of solder to the tip of a base pin within which a lead-in wire is disposed, the lead-in wire extending into the tip to be joined thereto by the solder. Welding is usually effected by the application of a welding electrode to the external surface of the tip of a base pin within which a lead-in wire is disposed, the lead-in wire extending into the tip to be joined thereto upon energization of the welding electrode. Each of these means is characterized by certain advantages. Unfortunately, there are also disadvantages associated therewith.

With respect to crimping, particularly when a rolled or seamed pin is used, there is the tendency and danger of the seam opening up upon the application of the crimping force. A crimped pin, of course, leaves much to be desired from an appearance viewpoint. Because of the deformation necessarily involved in crimping, there is always the danger of an accidental catching of the deformed portion of the pin in certain types of lampholders or sockets which, many times, are not made by the manufacturer of the based article.

When solder is used, care must be exercised to insure close control over both the quantity and quality thereof. Too little solder or solder of poor quality may result in a poor electrical connection. Too much solder may also cause an abnormal and undesirable increase in the overall length of the base pins and/or a poor electrical connection. In addition to these considerations, there is always the problem of poor electrical connections which develop during the use of the lamp due to corrosion of the solder and/or corrosive effects of flux which may be present on the pins.

When a welding tool is applied to the tip of a base pin to secure thereto the lead-in wire extending into the aperture provided therefor in the tip of the pin, the heat generated during this welding operation melts the tip of the pin to such an extent that the pin is somewhat shorter after welding than it is before welding. To compensate for this, and to try to obtain pins of uniform length in the finished product, it has been suggested that initially the pins be made longer than desired in the finished product and rigid controls be exercised during the welding operation to make sure that each pin is shortened to the same extent. In addition to this pin tip problem, welded pin tips are often dirty and of irregular contour, thus detracting considerably from the appearance of the lamp.

In the co-pending application of Harold I. Wiley, Jr., et al., Serial Number 763,509, filed September 26, 1958, and assigned to the same assignee as this application, a new method of establishing an electrical connection between a lead-in wire extending from an electrical device and the electrical contact member of a base with which the electrical device is provided is disclosed. In accordance with the teachings of that application, a lead-in wire extending from an electrical device is welded to an electrical contact member of a base interiorly thereof. The electrical device with the lead-in wire extending therefrom, and the base having an electrical contact member are advanced toward one another. During at least a portion of this relative movement of the electrical device with respect to the base, one electrode of a welding circuit is connected to the lead-in wire of the electrical device and the other electrode of the welding circuit is connected to the electrical contact member of the base. When the lead-in wire of the electrical device and the electrical contact member of the base touch one another, the electrical circuit through the aforementioned welding electrodes is closed thereby, thus permitting the condenser in the welding circuit to discharge and effect a welding of the lead-in wire to the contact member.

Although conventional, condenser discharge welding circuits of the type shown in the referenced application give satisfactory results in most cases, there are some circumstances under which a poor weld or no weld at all may occur. For example, when a relatively good firm physical contact is made between the members to be welded, so that the contact resistance is relatively low, there is a tendency for the condenser to discharge through its limiting resistor without generating enough heat at the contact point to effect a satisfactory weld. In fact, some times no weld at all is made. The fact that "blind" welding is involved makes the resolution of this problem quite difficult; one cannot readily see just when the lead-in wire and the electrical contact member touch one another since the weld is being made interiorly of the base. Even slight variations in the length of the lead-in wires compound the problem.

Various conventional welding techniques, such as single condenser discharge with and without resistance, and single condenser discharge with and without its resistance plus high frequency as a triggering device, were employed without substantial success in trying to solve this particular problem. Since the exact moment of time at which the lead-in wires touch the electrical contact members is not always known precisely, external timing devices common in alternating current and other types of welding circuits did not provide the answer to the problem.

The resolution of this problem, in accordance with the principles of my invention, is obtained by a welding circuit that triggers itself, and gives a time element not common to a conventional condenser discharge but keeps the advantage of a condenser in its ability to store a given amount of energy. In the circuit of my invention, a condenser of relatively large capacity is connected in parallel with a suitable D.C. supply, a condenser of relatively small capacity is connected in parallel with the condenser of relatively large capacity with a resistor in series therebetween, and the welding electrodes are connected directly in parallel with the condenser of relatively small capacity with no resistor therebetween. The wave form does not appear as a conventional condenser discharge through a resistance for, on closing the circuit with the work pieces, the small condenser discharged very rapidly, the large condenser only partially discharging through its limiting resistor. The heat generated at the point of contact of the work pieces burns back the lead-in wire slightly, thus opening the circuit at this point. With the circuit now open, the small condenser is recharged by the large condenser through the limiting resistor. Further relative movement of the work pieces toward one another brings them into contact once again, closes the circuit therethrough, effects a rapid discharge of the small condenser, further heating of the work pieces, etc. This cycle repeats itself until the voltage drop across the condensers is such that the circuit through the work pieces no longer opens and the weld is completed.

In the specific embodiment of the invention illustrated in the accompanying drawing, Figure 1 is a fragmentary, elevational view, showing the relative disposition, at one point in the manufacturing cycle, of a fluorescent lamp having a pair of lead-in wires extending therefrom and a lamp base having a pair of electrical contact members disposed therein, the base being spaced apart from the lamp, the lead-in wires being axially aligned with the electrical contact members but spaced therefrom, and the welding electrodes being in engagement with their respective work pieces.

Figure 2 is a fragmentary, elevational view, partly in section, showing the relative disposition of the several members identified above in the brief description of Figure 1, at the time the work pieces engage one another to trigger the schematically illustrated welding circuit associated therewith.

The fluorescent lamp, a fragmentary portion of which is shown in Figure 1, is one of the conventional commercial types, i.e., it comprises a hermetically sealed envelope 2, having a filamentary electrode disposed at each end thereof and supported by a pair of lead-in wires 4 and 6 extending therefrom. The base 8 is of the type shown and described in the co-pending application of S. C. Shappell and R. B. Thomas, Serial Number 637,196, filed January 30, 1957, and assigned to the same assignee as this application. The base 8 comprises a body member 10 of insulating material provided with a central aperture 12 extending therethrough, a pair of spaced, metal, electrical contact strips 14 and 16 disposed within said aperture 12, and an annular metal shell 18 within which the body member 10 is secured.

In effecting a welding of the lead-in wires 4 and 6 to the inner ends of the contact strips 14 and 16 respectively, the lamp envelope 2, with the lead-in wires 4 and 6 projecting substantially parallel therefrom, and the base 8 are disposed in axial alignment substantially as shown in Figure 1, and a pair of welding electrodes 20 and 22, insulated from one another, are advanced into the aperture 12 in the base body member 10 and into engagement with contact strips 14 and 16 respectively. A pair of welding electrodes 24 and 26, insulated from one another, are advanced into engagement with the lead-in wires 4 and 6 respectively intermediate the ends thereof, and relative movement is effected between the lamp envelope 2 on the one hand, and the base 8 and the welding electrodes 20 and 22 disposed therein on the other hand, to cause the ends of the lead-in wires 4 and 6 to touch the inner ends of the contact strips 14 and 16 respectively. Engagement of the inner ends of the contact strips 14 and 16 by the ends of the lead-in wires 4 and 6 respectively, closes a pair of separate welding circuits through the welding electrodes 20 and 24 on the one hand and 22 and 26 on the other hand, to thereby effect a welding of the lead-in wires to the contact strips in the base.

A welding circuit associated with lead-in wire 6 and contact strip 16 is shown schematically in Figure 2. A similar welding circuit, not shown, is associated with lead-in wire 4 and contact strip 14. The circuit comprises a D.C. supply 30, a condenser 32 of relatively large capacity connected in parallel with the D.C. supply 30, and a condenser 34 of relatively small capacity connected in parallel with condenser 32 with a resistor 36 connected in series therebetween, the welding electrodes 22 and 26, in engagement with the work pieces 16 and 6 respectively, being connected directly in parallel to the condenser 34 with no resistor therebetween. A switch 38, disposed in the line between the D.C. supply 30 and the condenser 32, is normally closed and is opened just prior to the closing of the welding circuit by engagement of the work pieces 6 and 16 with one another.

Closing of the welding circuit by engagement of the work pieces 6 and 16 with one another causes the small condenser 34 to discharge very rapidly and generate enough heat at the point of contact of the work pieces to melt the tip of the lead-in wire 6, cause a balling thereof and consequential breaking of contact with the electrical contact member 16 which also is heated somewhat by the rapid discharging of the small condenser 34. Although there is some discharging from the large condenser 32 during this time period, it is not very great since the large condenser 32 discharges through its limiting resistor 36 whereas there is no limiting resistor between the small condenser 34 and the welding electrodes 22 and 26. Although the welding circuit through the work pieces 6 and 16 is now open, the large condenser 32 continues to discharge through its limiting resistor 36, thereby re-charging the small condenser 34. The lamp 2 and the base 8 are brought closer to one another to re-establish engagement of the work pieces with one another, thereby again closing the welding circuit therethrough and effecting a second discharging of the small condenser 34. The heat generated thereby effects a further melting and balling of the tip of the lead-in wire and a further heating of the electrical contact member 16. This cycle repeats itself several times until a firm physical adherence of the molten balled tip of the lead-in wire to the heated electrical contact member is obtained. When this occurs, the above-described cycling terminates and both condensers discharge to complete the welding operation.

In the specific embodiment of the invention shown in the drawing and described above, the D.C. supply voltage is between about 45 to 60 volts, the condenser 32 is about 38,000 microfarads, the condenser 34 is about 750 microfarads and the resistor 36 is about 1 ohm. The lead-in wires 4 and 6 are copper clad iron of a diameter of about .018 to .020 inch. The particular contact strips 14 and 16 of the base 8 are nickel plated steel. It will be readily appreciated by those skilled in the art that the circuit values may be changed in accordance with known principles in the adaptation of the circuit to applications and structures other than the one described above in the specific embodiment of the invention. For example, in adapting the circuit for use in welding a pair of helically twisted wires to a single pin fluorescent lamp base as shown in the above-identified application of Harold I. Wiley, Jr., et al., I have found that satisfactory results may be obtained by merely connecting the two separate circuits associated with lead-in wires 4 and 6 of this application in parallel.

What I claim is:

1. A circuit for welding a pair of work pieces during relative movement thereof toward one another, said circuit comprising: a source of direct current; a first condenser of relatively large capacity connected in parallel with said source of direct current; a second condenser of relatively small capacity connected in parallel with said first condenser; a resistor connected in series between said first and said second condenser; and a pair of electrodes in engagement with said pair of work pieces and connected directly in parallel with said second condenser; said circuit being normally open and being closed by the engagement of the work pieces with one another, whereby said second condenser discharges relatively rapidly and substantially completely to effect a heating of said work pieces and a foreshortening of at least one thereof to break the circuit, while the said first condenser is discharging relatively slowly and only partially through said resistor, the discharging of said first condenser continuing after the circuit has been broken as aforesaid to effect a re-charging of the said second condenser, said re-charged second condenser being again discharged relatively rapidly and substantially completely upon further relative movement of the said work pieces into re-engagement with one another whereby the adjacent ends of said work pieces are further heated, the aforementioned cycles of making and breaking the circuit and charging and recharging the said second condenser in the aforementioned manner continuing until the said work pieces have been welded to one another.

2. A circuit for welding a pair of work pieces during relative movement thereof toward one another, said circuit comprising: a source of direct current; a first condenser of relatively large capacity connected in parallel with said source of direct current; a second condenser of relatively small capacity connected in parallel with said first condenser; a resistor connected in series between said first and said second condenser; and a pair of electrodes in engagement with said pair of work pieces and connected directly in parallel with said second condenser; said circuit being normally open and being closed by the engagement of the work pieces with one another, whereby said second condenser discharges relatively rapidly and substantially completely to melt the tip of one of said work pieces, cause a balling thereof, and a foreshortening thereof to break the circuit, while the said first condenser is discharging relatively slowly and only partially through said resistor, the discharging of said first condenser continuing after the circuit has been broken as aforesaid to effect a re-charging of the said second condenser, said re-charged second condenser being again discharged relatively rapidly and substantially completely upon further relative movement of the said work pieces into re-engagement with one another whereby the aforementioned tip of one of said work pieces is further melted and balled, the aforementioned cycles of making and breaking the circuit and charging and recharging the said second condenser in the aforementioned manner continuing until the said work pieces have been welded to one another.

3. A circuit for welding a lead-in wire extending from an electric lamp to an electrical contact member of a lamp base during relative movement thereof toward one another, said circuit comprising: a source of direct current; a first condenser of relatively large capacity connected in parallel with said source of direct current; a second condenser of relatively small capacity connected in parallel with said first condenser; a resistor connected in series between said first and said second condenser; and a pair of electrodes in engagement with said lead-in wire and said contact member and connected directly in parallel with said second condenser; said circuit being normally open and being closed by the engagement of the lead-in wire and the contact member with one another, whereby said second condenser discharges relatively rapidly and substantially completely to melt the tip of said lead-in wire, cause a balling thereof, and a foreshortening thereof to break the circuit, while the said first condenser is discharging relatively slowly and only partially through said resistor, the discharging of said first condenser continuing after the circuit has been broken as aforesaid to effect a re-charging of the said second condenser, said re-charged second condenser being again discharged relatively rapidly and substantially completely upon further relative movement of the said lead-in wire and said contact member into re-engagement with one another whereby the aforementioned tip of said lead-in wire is further melted and balled, the aforementioned cycles of making and breaking the circuit and charging and recharging the said second condenser in the aforementioned manner continuing until the said lead-in wire and said contact member have been welded to one another.

References Cited in the file of this patent
UNITED STATES PATENTS
2,853,593    Albrecht _____ Sept. 23, 1958